(12) United States Patent
Hwang et al.

(10) Patent No.: US 12,176,115 B2
(45) Date of Patent: Dec. 24, 2024

(54) APARATUS AND METHOD FOR DISMANTLING FOR HEAVY WATER REACTOR FACILITIES

(71) Applicant: KOREA HYDRO & NUCLEAR POWER CO., LTD., Gyeongju-si (KR)

(72) Inventors: Seok-Ju Hwang, Daejeon (KR); Young Hwan Hwang, Daejeon (KR); Ju-Young Yoon, Daejeon (KR); Cheon-Woo Kim, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 240 days.

(21) Appl. No.: 17/422,834

(22) PCT Filed: Jan. 8, 2020

(86) PCT No.: PCT/KR2020/000338
§ 371 (c)(1),
(2) Date: Jul. 14, 2021

(87) PCT Pub. No.: WO2020/149567
PCT Pub. Date: Jul. 23, 2020

(65) Prior Publication Data
US 2022/0068514 A1 Mar. 3, 2022

(30) Foreign Application Priority Data
Jan. 18, 2019 (KR) .................. 10-2019-0006688

(51) Int. Cl.
*G21D 1/00* (2006.01)
*B26D 1/28* (2006.01)

(52) U.S. Cl.
CPC .............. *G21D 1/003* (2013.01); *B26D 1/28* (2013.01)

(58) Field of Classification Search
CPC ............. G21D 1/003; B26D 1/12; B26D 1/28
See application file for complete search history.

(56) References Cited

U.S. PATENT DOCUMENTS 6,599,067 B2  7/2003 Scott et al.

FOREIGN PATENT DOCUMENTS

| JP | 07-251326 | 10/1995 | |
| JP | H0827392 B2 * | 3/1996 | ............... G21F 9/30 |
| JP | 2005291710 | 10/2005 | |

(Continued)

OTHER PUBLICATIONS

Brecher, C. (2014). Bearing. In: Laperrière, L., Reinhart, G. (eds) CIRP Encyclopedia of Production Engineering. Springer, Berlin, Heidelberg. https://doi.org/10.1007/978-3-642-20617-7_6522 (Year: 2014).*

*Primary Examiner* — Sharon M Davis
(74) *Attorney, Agent, or Firm* — LEX IP MEISTER, PLLC (57) ABSTRACT

A heavy-water reactor facility dismantling apparatus according to an embodiment includes: a first cutting device for cutting the periphery of a first nozzle portion of a calandria, wherein the first nozzle portion is connected to the upper end of a first pipe positioned in the calandria of a heavy-water reactor facility; a second cutting device for cutting a first support part of the calandria, wherein the first support portion is connected to the lower end of the first pipe connected to the first nozzle portion; and a fixing and drawing device for fixing and drawing the first nozzle portion cut by the first cutting device.

6 Claims, 11 Drawing Sheets

(56) References Cited

FOREIGN PATENT DOCUMENTS

| | | | | |
|---|---|---|---|---|
| JP | 2005291710 | A | * | 10/2005 |
| JP | 2007007763 | A | * | 1/2007 |
| JP | 4158657 | | | 10/2008 |
| JP | 4167198 | B2 | * | 10/2008 |
| KR | 200399632 | | | 10/2005 |
| KR | 1020120082831 | | | 7/2012 |
| KR | 1226689 | | | 1/2013 |
| KR | 101548517 | | * | 12/2013 |
| KR | 1020130141147 | | | 12/2013 |
| KR | 20150075822 | | * | 7/2015 |
| KR | 1859359 | | | 5/2018 |

\* cited by examiner

APARATUS AND METHOD FOR DISMANTLING FOR HEAVY WATER REACTOR FACILITIES

TECHNICAL FIELD

The present invention relates to an apparatus for dismantling a heavy water reactor facility, and a method thereof.

BACKGROUND ART

In general, among nuclear facilities used for nuclear power generation, a heavy water reactor facility includes a calandria and a calandria vault receiving the calandria therein.

As a nuclear fuel injection cylinder for a nuclear reactor of a heavy water reactor type of nuclear power plant, the calandria has a cylindrical pipe structure that injects nuclear fuel during normal operation of the power plant and discharges a bundle of combusted nuclear fuel.

In dismantling of the heavy water reactor facility, when a guide pipe and a poisonous material injection pipe, which are highly radioactive structures received in a calandria, are dismantled, there is a risk of worker exposure and radiation leakage.

DISCLOSURE

Technical Problem

The present embodiment relates to an apparatus for dismantling a heavy water reactor facility, which can easily lift and dismantle a guide pipe and poisonous material injection pipe installed inside a calandria to the outside, and a method thereof.

Technical Solution

A dismantling apparatus of a heavy water reactor facility according to an embodiment includes: a first cutting device that cuts the periphery of a first nozzle portion of a calandria connected to an upper end of a first pipe disposed inside the calandria of the heavy water reactor facility; a second cutting device that cuts a first support portion of the calandria connected to a lower end of the first pipe connected to the first nozzle portion; and a fixing and withdrawing device that fixes and draws out the first nozzle portion cut by the first cutting device.

The first nozzle portion may be formed on an outer wall of the calandria, and the first support portion may be formed on an inner wall of the calandria.

The first cutting device may include: a coring body that is rotatable and includes a through-hole formed inside of the coring body; and a first cutting portion provided on an inner wall of the coring body, and the first cutting device may cut an outer wall of the calandria along the periphery of the first nozzle portion.

The heavy water reactor facility may further include a second pipe that crosses the first pipe, and a second nozzle portion of the calandria connected with one end of the second pipe, and the first cutting device cuts the periphery of the second nozzle portion.

The calandria may include a main shell, subshells connected to opposite ends of the main shell, and an end shield connected to the subshells, and, the second cutting device may include: a second cutting portion that moves along a pressure pipe penetration portion formed in the end shield and cuts between a lower end of the first pipe and the first support portion, and a movement control portion that controls movement of the cutting portion.

The second cutting portion may include: an end effector that is disposed at an end of the second cutting portion; a support portion that supports the end effector; a cut joint portion that is connected to the support portion and changes a direction of the end effector; and a support driver that drives the support portion.

The movement control portion may include: a forward and backward movement control portion that controls forward and backward movement of the second cutting portion, and a vertical movement control portion that controls vertical movement of the second cutting portion.

The heavy water reactor facility may further include a second support portion of the calandria, connected to the other end of the second pipe, and the second cutting device may cut the second support portion.

The fixing and withdrawing device may include a fixing portion that fixes the first nozzle portion, and a withdrawing portion that moves the fixing portion.

According to an embodiment of the present invention, a method for dismantling a heavy water reactor facility including a calandria that includes a main shell, subshells connected to opposite ends of the main shell, and an end shield, a calandria vault that receives the calandria, a cover assembly that is disposed in an upper portion of the calandria vault to cover the calandria, a pressure tube that horizontally passes through the inside of the calandria, and a calandria tube that surrounds the pressure tube is provided. The method includes: removing the pressure tube and the calandria tube; dismantling the cover assembly by opening an upper portion of the calandria vault; cutting the periphery of a first nozzle portion of the calandria connected to an upper end of a first pipe disposed inside the calandria by using a first cutting device; fixing the cut first fixing portion by using a fixing and withdrawing device; cutting a first support portion of the calandria, connected with a lower end of the first pipe connected to the first nozzle portion by using a second cutting device; and drawing out the first nozzle portion and the first pipe by using a fixing and withdrawing device.

In the cutting the first nozzle portion, a coring body of the first cutting device rotates and a first cutting portion provided in the coring body cuts an outer wall of the calandria along the periphery of the first nozzle portion.

The second cutting device may include a second cutting portion that cuts between a lower end of the first pipe and the first support portion and a movement control portion that controls movement of the second cutting portion, and the cutting of the first support portion may include: inserting an end effector of the cutting portion into the calandria through a pressure pipe penetration portion formed in the end shield; locating the end effector adjacent to the first support portion by using a cutting joint portion of the cutting portion; and cutting between the lower end of the first pipe and the first support portion by using the end effector.

The method may further include: cutting a periphery of a second nozzle portion of the calandria connected with one end of a second pipe that crosses the first pipe; fixing the cut second nozzle portion by using the fixing and withdrawing device; cutting a second support portion of the calandria connected with the other end of the second pipe connected to the second nozzle portion by using the second cutting device; and drawing out the second nozzle portion and the second pipe by using the fixing and withdrawing device.

Advantageous Effects

According to the embodiments, the guide pipe and the poisonous material injection pipe installed inside the calandria can be easily lifted and dismantled to the outside.

In addition, by using the dismantling method of the heavy water reactor facility, the calandria can be dismantled safely and quickly without worker exposure, by remote control.

MODE FOR INVENTION

The present invention will be described more fully hereinafter with reference to the accompanying drawings, in which exemplary embodiments of the invention are shown. The present invention may be implemented in several different forms and is not limited to the embodiments described herein.

In order to clearly explain the present invention, parts that are irrelevant to the description are omitted, and the same reference signs are used for the same or similar constituent elements throughout the specification.

In addition, since the size and thickness of each component shown in the drawings are arbitrarily indicated for convenience of explanation, the present invention is not necessarily limited to as illustrated.

Figure 1:
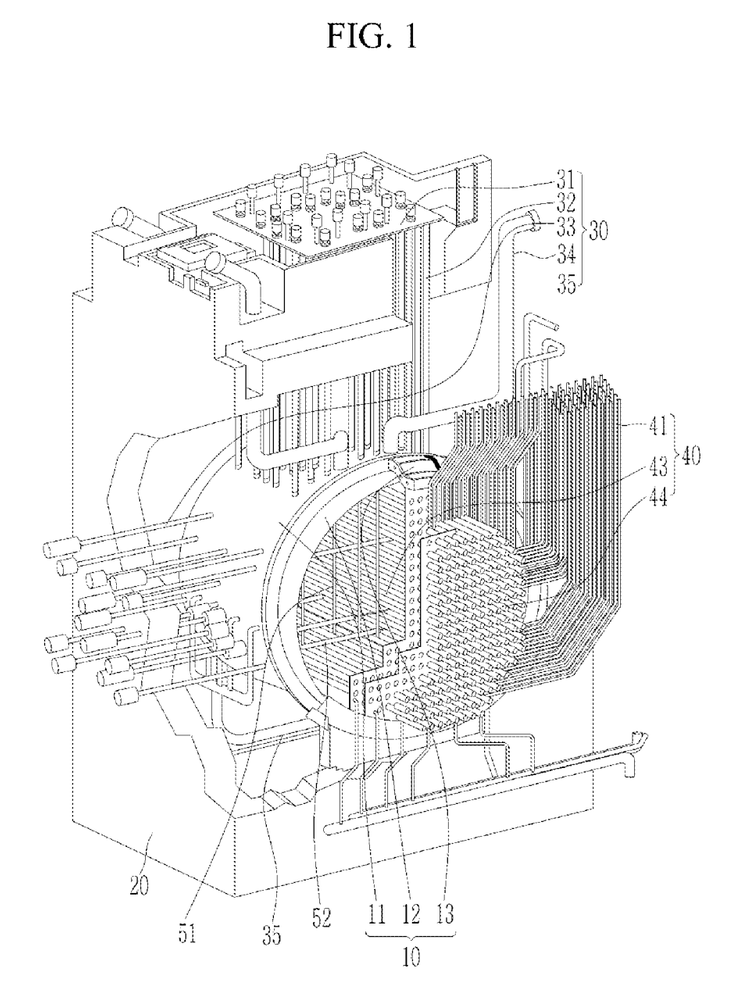
FIG. 1 is a schematic perspective view of a heavy water reactor facility according to an embodiment.
Figure 2:
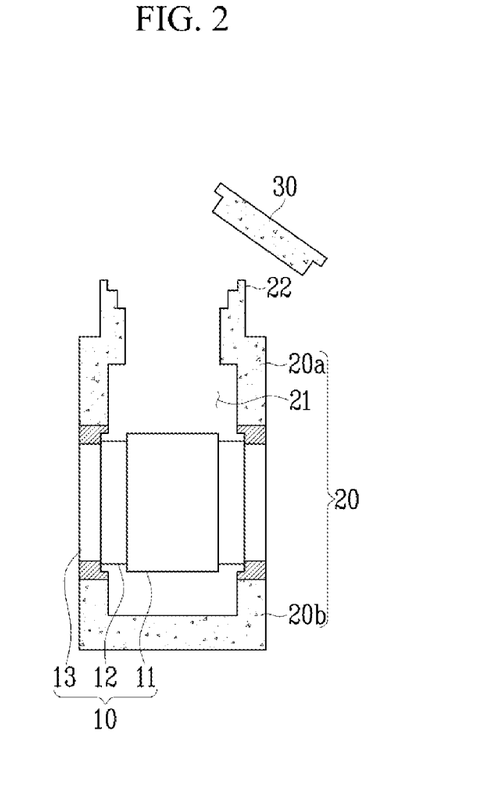
FIG. 2 is a schematic side view of the heavy water reactor facility according to the embodiment.
Figure 3:
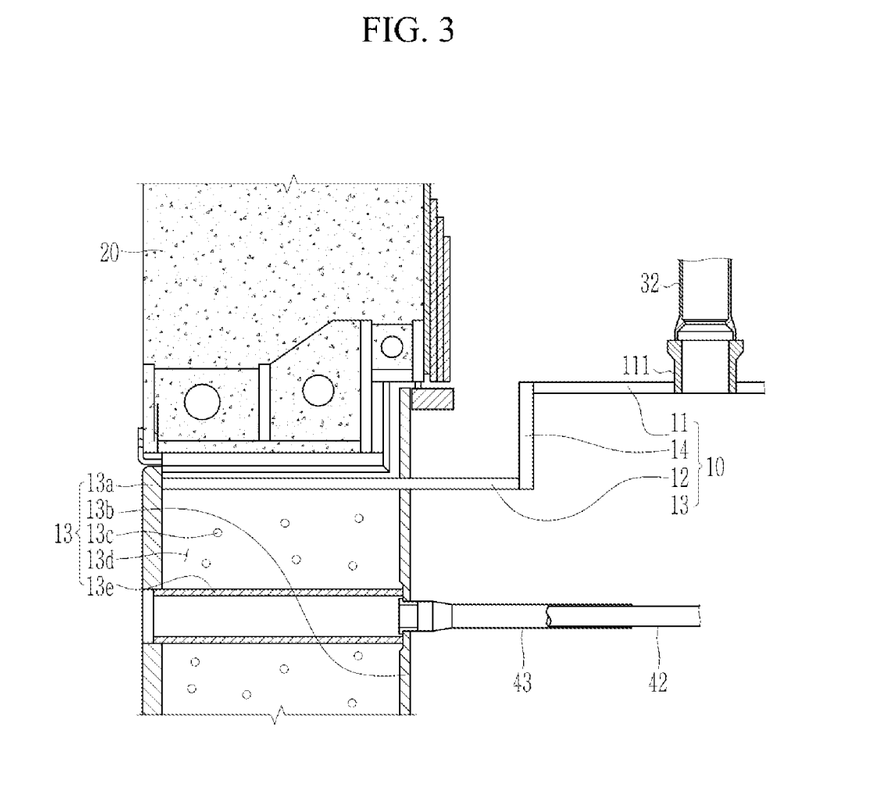
FIG. 3 is an enlarged view of the part A of FIG. 2.

FIG. 1 is a schematic perspective view of a heavy water reactor facility according to an embodiment, FIG. 2 is a schematic side view of the heavy water reactor facility according to the embodiment, FIG. 3 is an enlarged view of the part A of FIG. 2.

Hereinafter, a CANDU type of heavy water reactor facility including a calandria as a heavy water reactor facility will be described as an example, but the heavy water reactor facility is not limited thereto.

As shown in FIG. 1 to FIG. 3, the heavy water reactor facility includes a cylindrical calandria 10, a calandria vault 20 that accommodates the calandria 10 in an interior portion 21, a cover assembly 30 that includes a reactivity mechanism deck 31 disposed in an upper portion 22 of the calandria vault 20 to cover the calandria 10, and a reactor pipe 40 installed in the calandria 10.

The calandria 10 may include a main shell 11 disposed in a center, subshells 12 disposed at opposite ends of the main shell 11, and an end shield 13 connected to the subshells 12.

The end shield 13 may include a fueling tube sheet 13a and a calandria tube sheet 13b that face each other, and a plurality of shield balls 13c and shielding water 13d that fill between the calandria tube sheet 13b and the fueling tube sheet 13a. The shield balls 13c may be balls made of carbon steel, and the shielding water 13d may be light water.

The calandria vault 20 may accommodate the calandria 10 in the interior portion 21 by supporting the end shields 13.

The cover assembly 30 may include the reactivity mechanism deck 31 that is supported by an upper portion of the calandria vault 20 and thus covers the calandria 10, an upper guide tube 32 that vertically connects the reactivity mechanism deck 31 and the calandria 10, a side guide tube 33 that is horizontally connected to the calandria 10, a pressure relief pipe 34 that is connected with the upper portion of the calandria 10 and releases an internal pressure of the calandria 10 to the outside, and a moderator pipe 35 that is connected with a side surface and a lower portion of the calandria 10 and through which a moderator flows in and flows out. Control devices such as a control rod and an absorbent rod can be inserted into the upper guide tube 32 and the side guide tube 33.

The reactor pipe 40 may include a coolant feeder 41 that supplies a coolant to the calandria 10, a pressure tube 42 that horizontally penetrates the calandria 10, a calandria tube 43 that is connected with the end shield 13 while surrounding the pressure tube 42, and an end fitting part 44 that is connected to one side of the end shield 13.

The calandria tube 43 may be connected to the calandria tube sheet 13b of the end shield 13.

Figure 4:
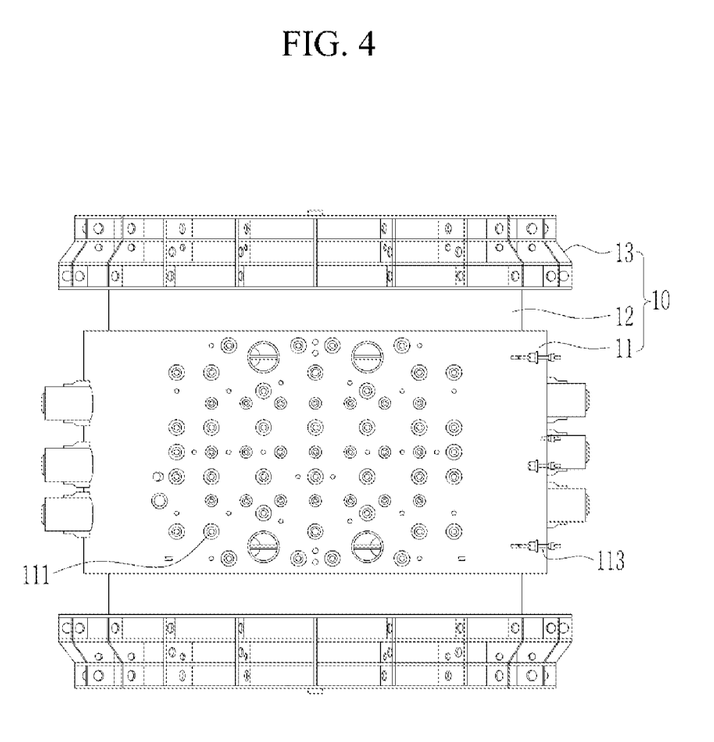
FIG. 4 is a top plan view of the heavy water reactor facility according to the embodiment.
Figure 5:
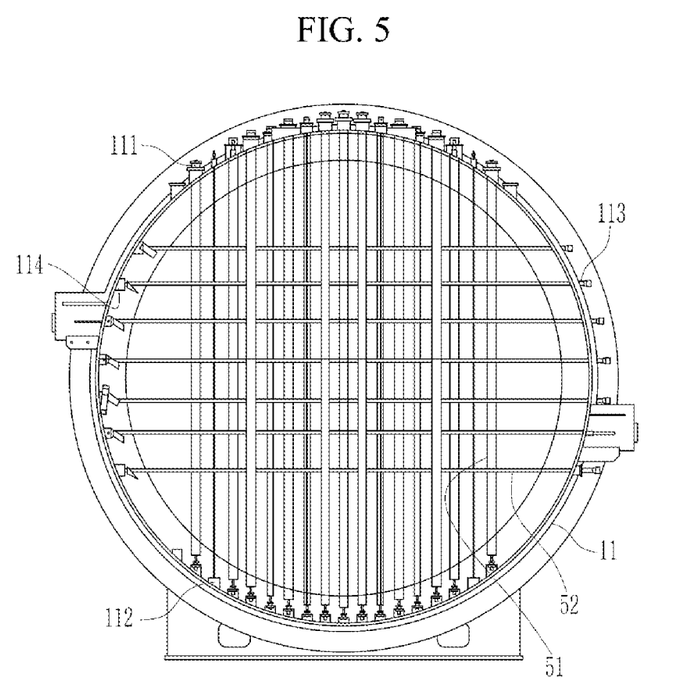
FIG. 5 is a cross-sectional view of the heavy water reactor facility according to the embodiment.

FIG. 4 is a top plan view of the heavy water reactor facility according to the embodiment, and FIG. 5 is a cross-sectional view of the heavy water reactor facility according to the embodiment.

As shown in FIG. 4 and FIG. 5, the heavy water reactor facility is in a state that pipes such as the pressure tube 42 and the calandria tube 43 connected to the calandria 10 are separated from the calandria 10.

Then, the heavy water reactor facility is in a state that the control devices such as the control rod and the absorbent rod connected with the calandria 10 are separated from the calandria 10 through the cover assembly 30.

Accordingly, the upper guide tube 32 and a cut first nozzle portion 111 are formed on an upper outer wall of the cylindrical calandria 10. In addition, the side guide tube 33 and a cut second nozzle part 113 are formed on the outer wall of one side of the calandria 10.

The first nozzle portion 111 is connected with an upper end of a guide pipe 51, which is a first pipe that is disposed vertically, and the second nozzle portion 113 may be connected with one end of a poisonous material injection pipe 52, which is a second pipe that is disposed horizontally. The guide pipe 51 is a pipe for guiding the reactivity control and monitoring device, and the poisonous material injection pipe 52 is a pipe for injecting a poisonous material for stopping the reactor.

In addition, a first support portion 112 that is connected with the guide pipi 51 is formed in a lower inner wall 11b. In addition, a second support portion 114 that is connected to the poisonous material injection pipe 52 is formed on the lower inner wall 11b of the other side of the calandria 10. The first support portion 112 may be connected to a lower end of the guide pipe 51, and the second support portion 114 may be connected to the other end of the poisonous material injection pipe 52.

As such, the first nozzle portion 111 and the first support portion 112 are disposed at respective ends of the guide pipe 51 to fix the guide pipe 51. In addition, the second nozzle portion 113 and the second support portion 114 are disposed at respective ends of the poisonous material injection pipe 52 to fix the poisonous material injection pipe 52.

In such a state, the guide pipe 51 and the poisonous material injection pipe 52, which are highly radioactive materials and are installed inside the calandria 10 of the heavy water reactor facility, are dismantled by using the dismantling apparatus of the heavy water reactor facility according to the embodiment of the present invention.

Figure 6:
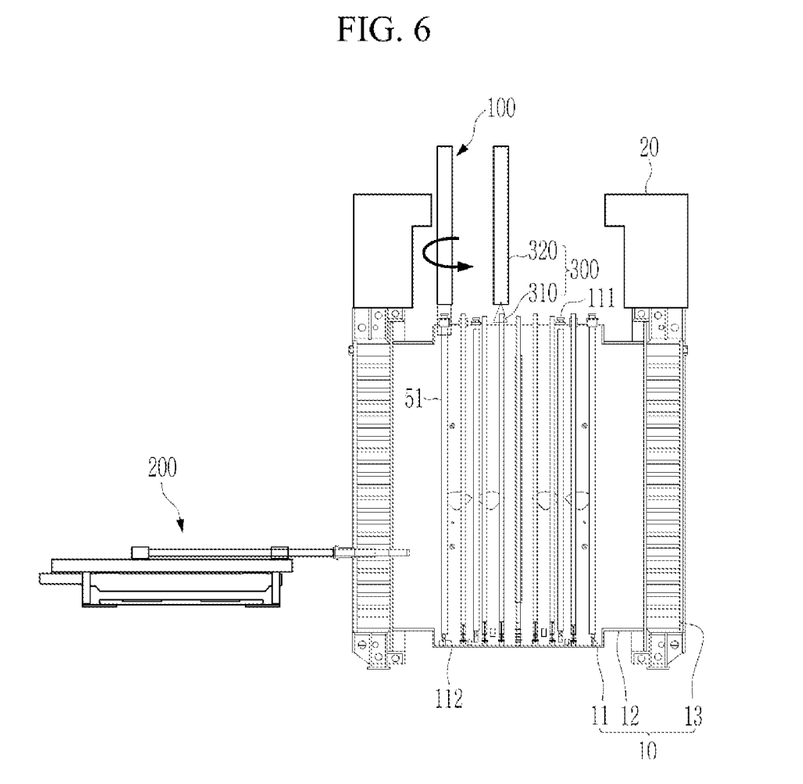
FIG. 6 is a schematic view of the heavy water reactor facility according to the embodiment.
Figure 7:
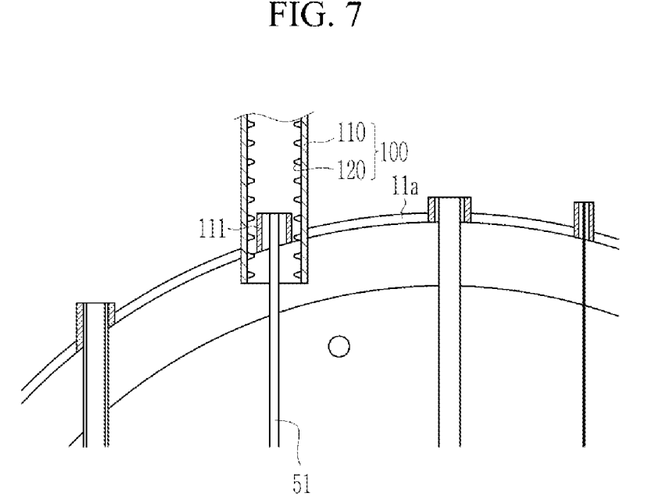
FIG. 7 is provided to describe an operation state of a first cutting device of the heavy water reactor facility according to the embodiment in detail.

FIG. 6 is a schematic view of the heavy water reactor facility according to the embodiment, and FIG. 7 is provided to describe an operation state of a first cutting device of the heavy water reactor facility according to the embodiment in detail.

As shown in FIG. 6 and FIG. 7, the dismantling apparatus of the heavy water reactor facility according to the embodiment includes a first cutting device 100, a second cutting device 200, and a fixing and withdrawing device 300.

The first cutting device 100 may include a coring body 110 that is rotatable and includes a through-hole formed therein, and first cutting portions 120 provided on an inner wall of the coring body 110.

The first cutting device 100 may cut the periphery of the first nozzle portion 111 connected to the upper end of the guide pipe 51 disposed inside the calandria 10 in a circular shape.

When the coring body 110 rotates at a high speed, the first cutting portions 120 disposed therein cut an outer wall 11a of the calandria 10 along the periphery of the first nozzle portion 111.

Figure 8:
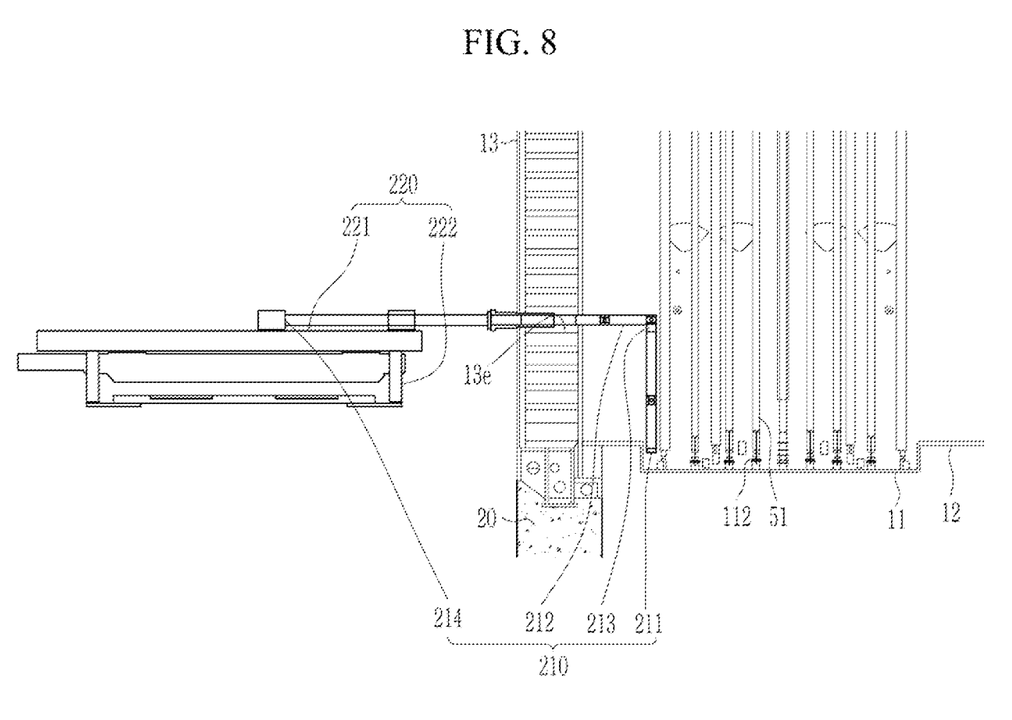
FIG. 8 is provided for description of an operation state of the second cutting device of the dismantling apparatus according to the embodiment in detail.

FIG. 8 is provided to describe the first cutting device of the dismantling apparatus of the heavy water reactor facility, and an operation for drawing out the poisonous material injection pipe using the fixing and withdrawing device according to the embodiment.

Figure 10:
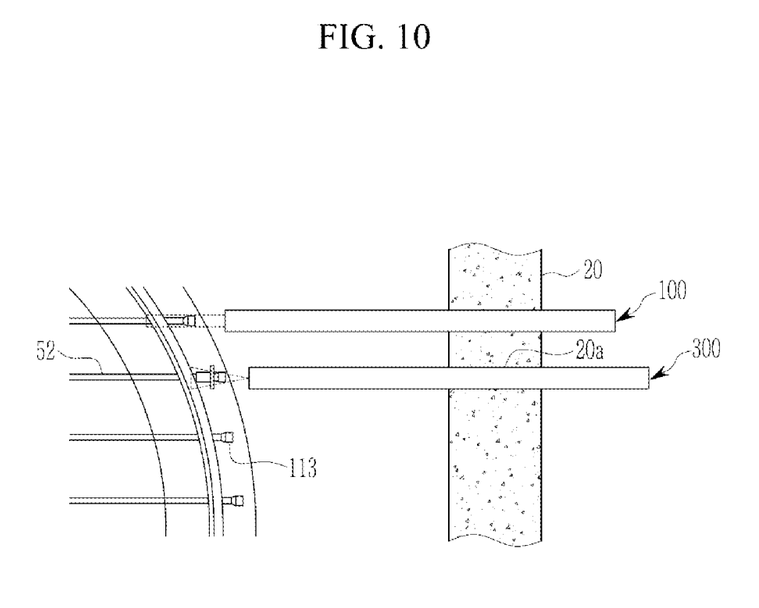
FIG. 10 is provided to describe the first cutting device of the dismantling apparatus of the heavy water reactor facility, and an operation for drawing out the poisonous material injection pipe using the fixing and withdrawing device according to the embodiment.

As shown in FIG. 10, the first cutting device 100 may circularly cut the periphery of the second nozzle portion 113 that is connected with one end of the poisonous material injection pipe 52 disposed inside the calandria 10. In this case, the first cutting device 100 may be inserted into the calandria vault 20 by using through-pipes 20a formed in the calandria 20. These through-pipes 20a may be openings generated in the calandria vault 20 after the side guide tube 33 is removed from the calandria vault 20, or may be openings formed directly in the calandria vault 20 using a penetrating tool.

Figure 9:
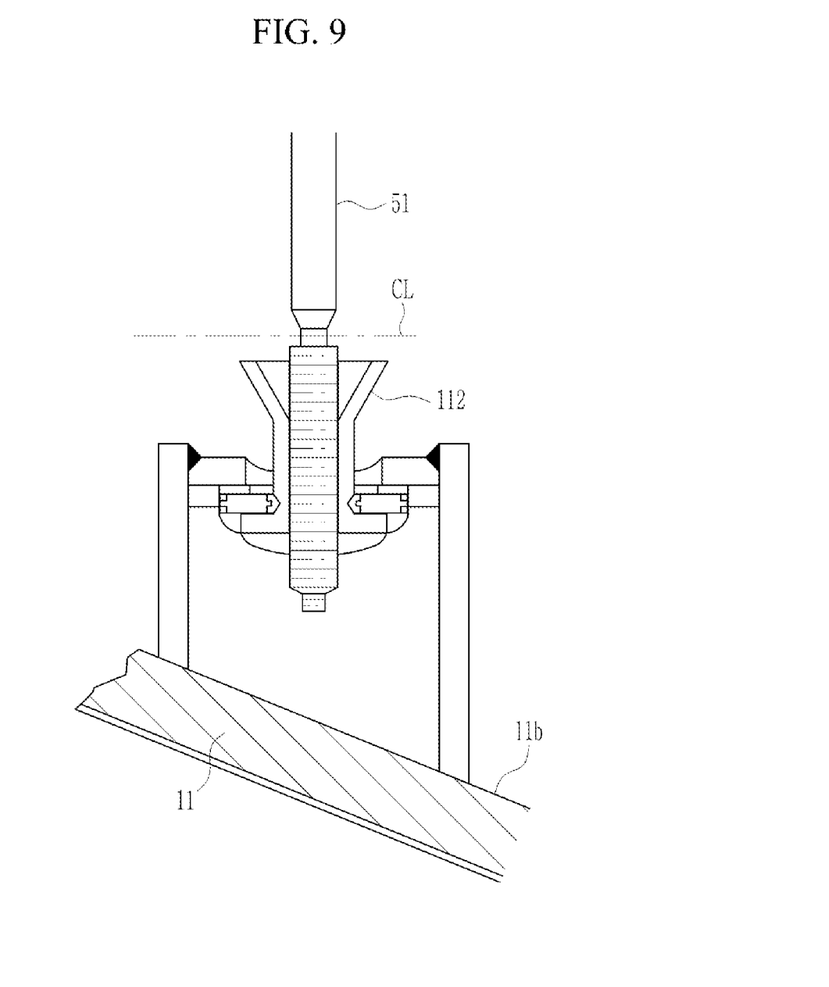
FIG. 9 is an enlarged view of the first supporting portion of FIG. 8.

FIG. 8 is provided for description of an operation state of the second cutting device of the dismantling apparatus according to the embodiment in detail, and FIG. 9 is an enlarged view of the first supporting portion of FIG. 8.

As shown in FIG. 8 and FIG. 9, the second cutting device 200 includes a second cutting portion 210 that cuts a lower end of the guide pipe 51, and a movement control portion 220 that controls movement of the second cutting portion 210.

The second cutting portion 210 moves along a pressure pipe penetration portion 13e formed in the end shield 13 of the calandria 10, and thus may cut between the lower end of the guide pipe 51 and the first support portion 112 along a cutting line CL.

The second cutting portion 210 may include an end effector 211 for cutting the lower end of the guide pipe 51, a plurality of support portions 212 for supporting the end effector 211, a cutting joint portion 213 connected to the support portion 212 and changing a direction of the end effector 211, and a support driver 214 for driving the support portion 212.

The end effector 211 may include a cutting means including an oscillator for irradiating a laser beam, but is not limited thereto, and may include a cutting means such as a rotation saw and the like.

The plurality of support portions 212 have a bar shape and may be connected by the cutting joint portions 213.

The cutting joint portions 213 may include articulated arms, but this is not restrictive.

The movement control portion 220 may include a forward and backward movement control portion 221 for controlling the forward and backward movement of the second cutting portion 210, and a vertical movement control portion 222 for adjusting the vertical movement of the second cutting portion 210. The position of the second cutting portion 210 may be controlled by using the movement control portion 220.

Meanwhile, the second cutting device 200 may cut between the second support portion 114 and the other end of the poisonous material injection pipe 52 disposed inside the calandria 10. In this case, the end effector 211 may be disposed between the other end of the poisonous material injection pipe 52 and the second support portion 114 by using the movement control portion 220 and the second cutting portion 210, thereby cutting between the other end of the poisonous material injection pipe 52 and the second support portion 114.

As shown in FIG. 6, the fixing and withdrawing device 300 includes a fixing portion 310 that fixes the first nozzle portion 111 separated from the outer wall of the calandria 10, and a withdrawing portion 320 that moves the fixing portion 310.

The fixing and withdrawing device 300 may fix the first nozzle portion 111 cut by the first cutting device 100 using the fixing portion 310, and may withdraw the first nozzle portion 111 to the outside of the calandria 10 together with the guide pipe 51 cut by the second cutting device 200 using the withdrawing portion 320.

In addition, the fixing and withdrawing device 300 may fix the second nozzle portion 113 cut by the first cutting device 100 using the fixing portion 310, and may withdraw the poisonous material injection cut by the second cutting device 200 to the outside of the calandria 10 together with the second nozzle portion 113 using the withdrawing portion 320.

Hereinafter, a method for dismantling using the dismantling apparatus of the heavy water reactor facility according to the embodiment of the present invention will be described in detail with reference to the accompanying drawing.

Figure 11:
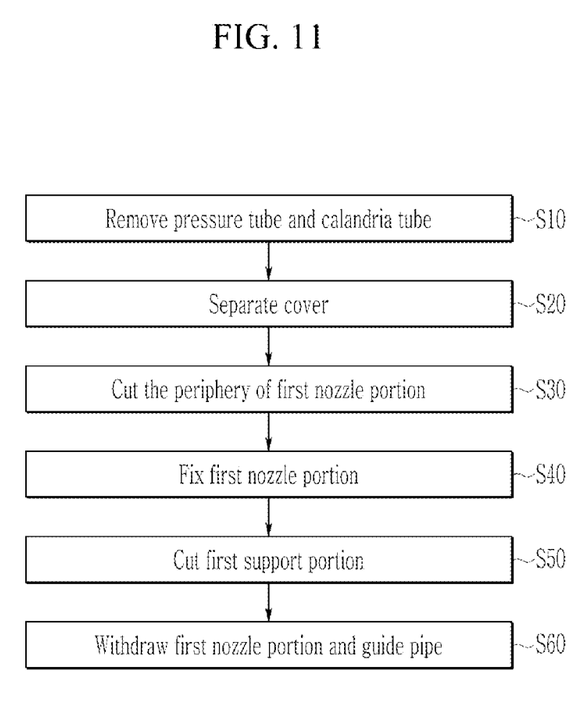

FIG. 11 is a flowchart of a dismantling method of the heavy water reactor facility according to the embodiment.

As shown in FIG. 4, FIG. 5, and FIG. 11, the pressure tube 42 that horizontally penetrates the calandria 10 and the calandria tube 43 that surrounds the pressure tube 42 can be removed. In this way, the exposure of workers can be minimized by removing the highly radioactive pressure tube 42 and calandria tube 43 in advance.

In addition, the pressure tube 42 and the calandria tube 43 are removed such that the pressure pipe penetration portion 13e can be provided in the end shield 13 of the calandria 10. Accordingly, the second cutting device 200 can be inserted into the calandria 10 through the pressure pipe penetration portion 13e.

Next, as shown in FIG. 2 and FIG. 11, the upper portion 22 of the calandria vault 20 is opened (S10).

The cover assembly 30 is separated from the calandria vault 20 to open the upper portion 22 of the calandria vault 20. Then, the upper portion 22 of the calandria vault 20 is expanded. An opening area of the upper portion 22 of the calandria vault 20 from which the cover assembly 30 is separated can be expanded using a cutting means such as a wire saw. As the upper portion 22 of the calandria vault 20 is expanded, the first cutting device 100 and the fixing and withdrawing device 300 can be easily inserted into the inner portion 21 of the calandria vault 20, and the guide pipe 51 inside the calandria 10 can be easily drawn out to the outer of the calandria vault 20.

Next, as shown in FIG. 6, FIG. 7, and FIG. 11, the periphery of the first nozzle portion 111 connected with the upper end of the guide pipe 51 is cut by using the first cutting device 100 (S30).

Specifically, while the coring body 110 of the first cutting device 100 rotates at a high speed, the first cutting portions 120 disposed therein cut the outer wall 11a of the calandria 10 along the periphery of the first nozzle portion 111. Accordingly, the periphery of the first nozzle portion 111 may be cut in a circle to separate the first nozzle portion 111 from the outer wall of the calandria 10.

Next, as shown in FIG. 6 and FIG. 11, the first nozzle portion 111 is fixed by using the fixing and withdrawing device 300 to prevent the cut first nozzle portion 111 from moving (S40).

Next, as shown in FIG. 6, FIG. 9, FIG. 10, and FIG. 11, the first support portion 112 connected to the lower end of the guide pipe 51 connected to the first nozzle portion 111 is cut by using the second cutting device 200 (S50).

Specifically, the end effector 211 of the second cutting portion 210 is inserted into the calandria 10 through the pressure pipe penetration portion 13e of the end shield 13.

In addition, the end effector 211 may be disposed adjacently between the lower end of the guide pipe 51 and the first support portion 112 using the cutting joint portion 213 of the second cutting portion 210.

In addition, it is possible to cut between the lower end of the guide pipe 51 and the first support portion 112 using the end effector 211. Accordingly, the guide pipe 51 is separated from the calandria 10.

Next, as shown in FIG. 6 and FIG. 11, the first nozzle portion 111 and the guide pipe 51 are drawn out to the outside of the calandria 10 by using the fixing and withdrawing device 300 (S60).

Meanwhile, the poisonous material injection pipe 52 can be dismantled by the same method as the dismantling method of the guide pipe 51. That is, the periphery of the second nozzle portion 113 of the calandria 10 connected to one end of the poisonous material injection pipe 52 is cut using the first cutting device 100. Then, the cut second nozzle portion 113 is fixed using the fixing and withdrawing device 300. Then, the second support portion 114 of the calandria 10 connected to the other end of the poisonous material injection pipe 52 connected to the second nozzle portion 113 is cut by using the second cutting device 200. Then, the second nozzle portion 113 and a second pipe are drawn out using the fixing and withdrawing device 300.

Such a method of dismantling the poisonous material injection pipe 52 may be carried out after dismantling of the guide pipe 51, but is not limited thereto, and may be performed simultaneously with dismantling of the guide pipe 51.

As described, when the heavy water reactor facility is dismantled, the decommissioning method of the heavy water reactor facility according to the embodiment enables the guide pipe 51 and the poisonous material injection pipe 52, which are highly radioactive structures received inside the calandria 10, to be easily lifted and dismantled to the outside of the calandria 10 with priority by using the first cutting device 100, the second cutting device 200, and the fixing and withdrawing device 30.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

100: first cutting device
111: first nozzle portion
112: first support portion
113: second nozzled portion
114: second support portion
200: second cutting device
300: fixing and withdrawing device

The invention claimed is:

1. A dismantling apparatus of a heavy water reactor facility that comprises a cylindrical calandria having a horizontal axis; the calandria comprising: an annular main shell, annular subshells connected to opposite ends of the main shell, and circular end shields connected to the subshells, the circular end shields comprising a plurality of pressure pipe penetrations therein; and a plurality of guide pipes passing vertically through the calandria in a direction orthogonal to the axis, a top end of each of the guide pipes extending through a first nozzle on an exterior surface of the main shell and a bottom end of the guide pipes connected to an inside surface of the main shell via a first support portion, the dismantling apparatus comprising:
  a first cutting device configured to separate the first nozzles from the main shell of the calandria by cutting around a periphery of the first nozzles;
  a second cutting device configured to be inserted into the calandria in a horizontal direction through a pressure pipe penetration in one of the end shields and to sever the bottom ends of the guide pipes from their corresponding first support portions; and
  a fixing and withdrawing device configured to engage with one of the nozzles of the guide pipes and remove the nozzle and its corresponding guide pipe from the calandria.

2. The dismantling apparatus of the heavy water reactor facility of claim 1, wherein
  the first cutting device comprises:
  a coring body that is rotatable and includes a through-hole formed inside of the coring body; and
  a first cutting portion provided on an inner wall of the coring body.

3. The dismantling apparatus of the heavy water reactor facility of claim 1, wherein
  the heavy water reactor facility further comprises a plurality of poison injection pipes passing horizontally through the calandria in a direction orthogonal to the axis, a first end of each of the poison injection pipes extending through a second nozzle on an exterior surface of the main shell and a second end of the poison injection pipes connected to an inside surface of the main shell via a second support portion, and the first cutting device is further configured to separate the second nozzles from the main shell of the calandria by cutting around a periphery of the second nozzles.

4. The dismantling apparatus of the heavy water reactor facility of claim 3, wherein the second cutting device is further configured to sever the second ends of the poison injection pipes from their corresponding second support portions.

5. The dismantling apparatus of the heavy water reactor facility of claim 1, wherein the second cutting device comprises:

a movement controller, an end effector that is disposed at an end of the second cutting device, a support portion that supports the end effector, and a cut joint that is connected to the support portion and configured to change a direction of the end effector.

6. The dismantling apparatus of the heavy water reactor facility of claim 5, wherein the movement controller comprises a forward and backward movement control portion configured to control forward and backward movement of the second cutting device, and a vertical movement control portion configured to control vertical movement of the second cutting device.

* * * * *